2,243,273

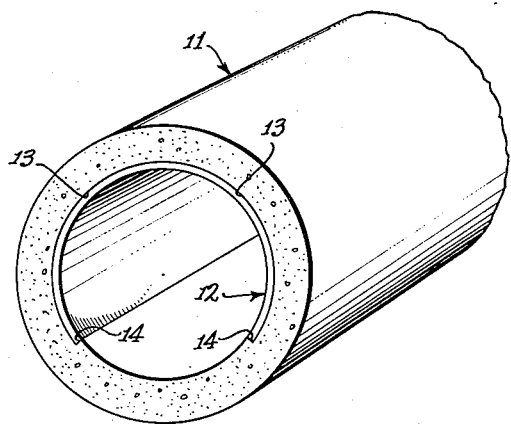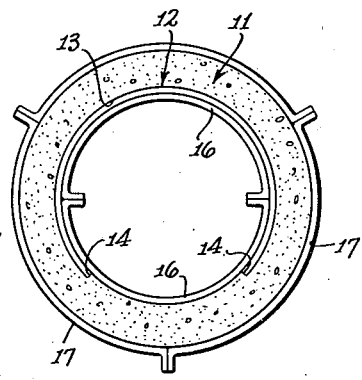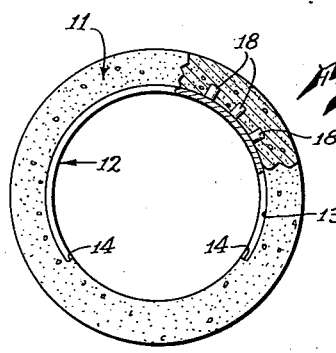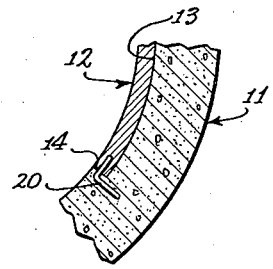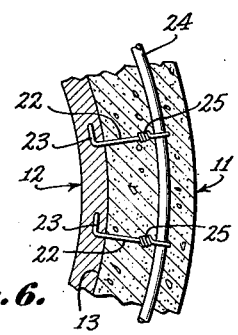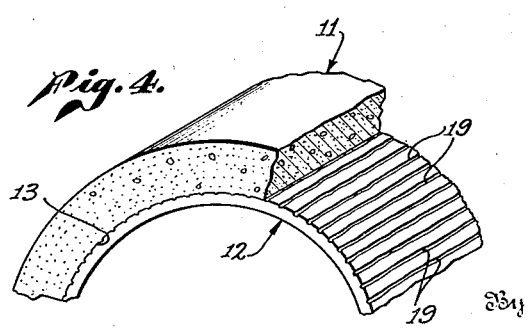
Inventor
ROBERT V. EDWARDS, Patented May 27, 1941

UNITED STATES PATENT OFFICE 2,243,273

LINED CONCRETE PIPE

Robert V. Edwards, San Marino, Calif., assignor to American Concrete and Steel Pipe Company, a corporation of Delaware Application January 26, 1940, Serial No. 315,798

2 Claims. (Cl. 138—86)

This invention relates generally to concrete pipe and the manufacture thereof and more particularly to concrete pipe having a lining of material which is resistant to attack by acids and alkali.

Pipes used for the conveyance of domestic sewage and industrial waste, except those of small diameter, are usually formed of concrete as this is the only economical material available. The use of concrete pipe presents serious difficulties in the transporting of sewage and wastes for the reason that the concrete is sometimes attacked by the action of the liquids and gases present in the material conveyed. Sewage gases have been found particularly destructive of the concrete in many localities and in view of this various attempts have been made to provide a lining for the pipe which will not be attacked by the material carried or the gases given off therefrom.

Linings have been applied both as a continuous coating and in the form of a multiplicity of liner plates. The various surface coatings which have been tried, to the best of my knowledge, present difficulties in the securing of a tight bond to the wall of the pipe and in the securing of an impervious and abrasion resistant surface. The results of these difficulties are that the surface failed to prevent the infiltration of destructive liquids and gases to the concrete and the defective bond at times permitted scaling off and cracking of the lining. In the case of the use of liner plates, it has been found that it is difficult to secure a perfect bond between adjacent plates that would prevent the infiltration of the destructive gases and liquids and difficulties are also encountered in the fabrication of the pipe with such liner plates due to the fact that several plates are usually used in a single pipe, often over 30 to a pipe section, and this greatly increases the cost of manufacture and lengthens the time required for the producion of the pipe.

In view of the difficulties and disadvantages of the various types of lining for concrete pipes with which I am familiar, it is a primary object of this invention to provide a new and improved concrete pipe embodying a single liner plate formed of an inert acid and alkali resistant material, securely mounted in the pipe to form the interior surface of the pipe in the region where the pipe is subject to attack by destructive liquids and gases.

It is also an object of this invention to provide a new and improved lined concrete pipe which may be economically and easily manufactured and which embodies a lining plate securely mounted on the inner surface of the concrete body forming the major portion of the inner surface of the pipe.

In this connection it is also an object to provide several ways or means for securing or locking the plate to the concrete body of the pipe.

It is also an object of this invention to provide a method of manufacturing the pipe which is practicable, simple, economic and effective to secure a product having the desired qualities.

These and other objects will be apparent from the drawing and the following description thereof. Referring to the drawing which is for illustrative purposes only;

Fig. 1 is a perspective and end view of a portion of a concrete pipe embodying the invention;

Fig. 2 is an end view of the concrete pipe and of the forms used in the manufacture of the pipe;

Fig. 3 is an end view partly in section to show one type of liner plate embodying projections on its outer surface for anchoring the plate into the body of the concrete;

Fig. 4 is a fragmentary perspective and end view broken away to show part of the pipe in section and illustrating another means for locking the plate into the body of the concrete;

Fig. 5 is a fragmentary cross section of a portion of the wall of a pipe illustrating another means for anchoring the plate into the body of concrete; and Fig. 6 is a fragmentary cross section of a pipe illustrating another form of pipe embodying another type of means for anchoring the plate to the concrete body.

More particularly describing the invention, the invention comprises generally the provision of a concrete pipe having a single liner plate which forms a substantial portion of the inner surface of the pipe and provides protection against the destructive action of liquid material carried by the pipe. Reference numeral 11 generally indicates the main body of the pipe which is formed of concrete. 12 indicates what will be termed a liner plate which is shown as extending over more than half of the inner surface of the concrete body. The plate is mounted within a recessed portion 13 of the concrete body 11, the recess terminating at each end in the shoulders 14.

It is to be pointed out that the size of the recess 13 and the size of the plate may be varied as desired. Inasmuch as it has been found that the gases given off by sewage are more destructive of the concrete than are the liquid and other material carried, it is sometimes unnecessary to provide a lining for that portion of the pipe which is at all times covered by the sewage being conveyed. Thus, for most installations, it is sufficient to have the liner plate 12 extend over the upper portion of the inner surface of the pipe and down below the center of the pipe to the approximate position in which it is shown in Fig. 1 as the level of the sewage carried will be above the shoulders 14.

The plate 12 is preferably formed of a material which is inert or highly resistant to the action of gases and liquids given off by sewage and is highly alkali and acid resistant. The plate may be a laminated or molded synthetic resin product embodying a large proportion of synthetic resin and any suitable filler material such as silica. The plate may be cast, fabricated, molded or otherwise made of a combination of synthetic resin and suitable filler such as fibre glass, asbestos, wood, fibre or some other material. A liner plate of laminated, heavily impregnated material, the laminations being formed of wood or other material, might also be used. The thickness of the plate would depend to some extent upon the material used for its construction and would in all cases be made as thin as practicable for the purposes for which it is to be used. In this connection, the thickness of the plate with relation to the concrete body of the pipe has been somewhat exaggerated in the drawing to facilitate illustration.

This invention contemplates several means or ways of securing the plate within the concrete body in order to secure a good bond between the pipe body and the plate. In Fig. 1 no particular means has been illustrated for securing the plate in the recess as it is contemplated that in one form of the invention the plate 12 may be fabricated to form an arcuate plate having a greater radius of curvature than the radius of the curvature of the surface of the recess 13. Thus, the plate 12 will be securely locked in the recess 13 by reason of the fact that it will constantly have a tendency to expand to its normal or fabricated shape.

In the manufacture of the pipe a suitable interior form 16 is provided upon which is mounted the plate 12. When a plate is utilized which is formed on an arc having a greater radius than the arcuate shape which the plate is to assume in the completed pipe, it will be necessary to provide means externally of the plate for securely holding it against the outer surface of the inner form 16. This may be done by interposing suitable braces between the plate 12 and the outer form generally indicated by numeral 17. When the concrete body 11 has been poured, the braces will necessarily become reenforcement means in the concrete body of the pipe. Hoops could also be used for holding the plate in place.

In Fig. 3 there is shown a form of plate which is provided at its outer surface with externally projecting lugs 18 which are embedded within the concrete body 11. In this form of the invention it may not be necessary to provide a plate having a different radius of curvature than the curvature which it is to assume in final position in the pipe and it is therefore optional whether the plate is fabricated to have a different curvature than the curvature it assumes in the completed pipe. The same is true of the type of plates shown in Figs. 4, 5 and 6 subsequently to be described.

In the form of the invention shown in Fig. 4 the plate 12 is provided at its outer surface with a plurality of scarifications or grooves 19 which serve to secure the necessary bond between the plate and the body of concrete.

In Fig. 5 there is shown another form of the invention wherein the plate is provided at its side margins with clips 20 which are embedded in the plate 12 either at the time of manufacture or may subsequently be driven in if the material of the plate warrants this. The clips extend into the main body of the concrete and serve as means for locking the plate into the body of the concrete. It is also contemplated that a locking means could be used which would extend through the lower edges of the plate and into the concrete.

In Fig. 6 there is shown another form of the invention wherein a securing means or anchor means in the form of wires 22 is provided. Each wire is embedded at one end 23 in the plate 12 at the time of fabrication of the plate. The other end of the wire extends outwardly of the outer surface of the plate and may be attached to a reinforcement member 24 as indicated at 25.

In the manufacture of the forms of the invention shown in Figs. 3, 4 and 5, the plate 12 is placed about the inner form as shown in Fig. 2. Reenforcement members may then be placed around the plate and inner form. The outer form 17 is then placed in position and spaced from the inner form by means of end rings or end forms commonly known and used in the art and therefore not shown in the drawing. The cement body 11 is then poured between the forms, thereby forming a concrete body 11 about the plate 12.

In the manufacture of the form of the invention shown in Fig. 6, after the plate 12 has been placed around the inner form 16 and suitable reenforcement members 24 placed around the plate 12 and form 16, the wires 22 are attached to reenforcement member 24. The outer form may then be placed in position and the pipe cast. It is contemplated that the reenforcement members 22 which have been shown in the form of wire may be made in some other form and it is also contemplated that they might be welded to the reenforcement member 24 or otherwise attached thereto.

I claim as my invention:

1. A pipe comprising a substantially cylindrical concrete body having a wide recess extending from end to end of its inner surface, and a protective liner plate of inert, alkali and acid resistant material mounted in said recess to provide an inner surface flush with the surface of the unrecessed inner surface of said concrete body, the normal curvature of said plate being on an arc of greater radius than the radius of the arc formed by the surface of the recessed portion of said concrete body whereby said plate is held in said recess by its tendency to assume its normal shape.

2. A protection for the inside surface of a concrete sewer pipe exposed to deleterious acid, gases or alkalis comprising a liner plate made of an inert filler such as silica which is inert to said acids, gases and alkalis and a binder of a synthetic resin which is also inert to said acids, gases and alkalis and which plate is thermoplastic and molded to fit the inside surface of said pipe, said plate when combined with said pipe providing sufficient resiliency to follow without fracture any normal distortion of the pipe when in use.

ROBERT V. EDWARDS.